United States Patent [19]

Suda

[11] Patent Number: 5,754,900
[45] Date of Patent: May 19, 1998

[54] INTRA-VIEWFINDER DISPLAY DEVICE AND OPTICAL APPARATUS

[75] Inventor: Yasuo Suda, Yokohama, Japan

[73] Assignee: Canon Kabushiki Kaisha, Tokyo, Japan

[21] Appl. No.: 802,983

[22] Filed: Feb. 21, 1997

[30] Foreign Application Priority Data

Feb. 28, 1996 [JP] Japan .................................... 8-067062

[51] Int. Cl.[6] .............................. G03B 13/02; G03B 17/20
[52] U.S. Cl. ........................................ 396/296; 396/384
[58] Field of Search .............................. 396/288, 296, 396/385, 384

[56] References Cited

U.S. PATENT DOCUMENTS

| | | |
|---|---|---|
| 4,104,650 | 8/1978 | Hosoe et al. ............... 396/296 X |
| 4,134,661 | 1/1979 | Ishizaka et al. ............... 396/296 |
| 4,141,639 | 2/1979 | Saito ........................... 396/296 |
| 4,294,529 | 10/1981 | Sato et al. ................. 396/296 X |

*Primary Examiner*—W. B. Perkey
*Attorney, Agent, or Firm*—Robin, Blecker, Daley & Driscoll

[57] ABSTRACT

An intra-viewfinder display device includes an optical system having a light splitting surface and arranged to guide light coming from an object to a viewer, and a display element for displaying information by using light of a predetermined wavelength. The information displayed by the display element is transmitted to the viewer by utilizing the light splitting surface. The light splitting surface has respective different spectral characteristics with respect to light of a wavelength band including the predetermined wavelength and light of wavelengths not included in the wavelength band.

32 Claims, 15 Drawing Sheets

SPECTRAL TRANSMISSION FACTOR OF LIGHT
SPLITTING SURFACE 15a OF CONDENSER LENS 15

LED

LED

SPECTRAL TRANSMISSION FACTOR OF LIGHT SPLITTING
SURFACE OF CONDENSER LENS

SPECTRAL TRANSMISSION FACTOR OF
SURFACE 105d OF PENTAGONAL PRISM 105

INTRA-VIEWFINDER DISPLAY DEVICE AND OPTICAL APPARATUS

BACKGROUND OF THE INVENTION

1. Field of the Invention

This invention relates to an intra-viewfinder display device adapted for a single-lens reflex camera, a still video camera or the like, arranged to provide a so-called superimposed display in which display information such as a distance measurement mark, a light measuring range or the like displayed by a display element is displayed at a part of a field of view of a viewfinder system (viewfinder field) in a state of being superimposed on an object image obtained through the viewfinder system (viewfinder image).

2. Description of Related Art

Single-lens reflex cameras, still video cameras and the like have been variously arranged to make a so-called superimposed display, in which display information such as a distance measurement mark, a light measuring range or the like selected out of a plurality of display data is indicated at a part of a viewfinder image, i.e., an object image, obtained within a viewfinder field, in a state of being superimposed upon the viewfinder image. Methods for the superimposed display have been variously developed to make the viewfinder image and the display information simultaneously viewable within one and the same field.

The arrangement for showing the viewfinder image and the display information in a superimposed state enables the camera operator (viewer) to simultaneously obtain information on the position and state of a display, such as "a distance measuring field for automatic focusing" and "a focusing state", without difficulty. An arrangement for providing a display of display information in a light-emitting manner not only prevents an oversight of the viewer but also improves the visibility of the display in the event of a low luminance of the object.

One of methods for the above-stated superimposed display applied to an intra-viewfinder display device of a single-lens reflex camera has been disclosed, for example, in Japanese Laid-Open Utility Model Application No. SHO 62-43346. In this method, the last reflecting surface of a pentagonal prism in a viewfinder system is formed as a light splitting surface. A light beam based on display information from a display element is introduced into the pentagonal prism through the light splitting surface. After that, the light beam is allowed to fall on an eyepiece through the same optical path as that of the viewfinder image. The display information is thus superimposed on a part of the viewfinder image to permit both the viewfinder image and the display information to be simultaneously viewable.

However, the method of superimposing the display information upon the viewfinder image by means of the light splitting surface which is semi-transparent, i.e., half-transmissive, reduces the light utilizing efficiency by half. This method thus has presented a problem because it causes the viewfinder image to become dark and not adequately viewable.

BRIEF SUMMARY OF THE INVENTION

It is an object of this invention to provide an intra-viewfinder display device for displaying display information displayed by display means in a state of being superimposed upon a viewfinder image, in such a manner that the intra-viewfinder display device is capable of not only brightly showing a viewfinder image but also providing the display information viewable in an adequate state.

To attain this object, an intra-viewfinder display device according to this invention comprises an optical system having a light splitting surface and arranged to guide light coming from an object to a viewer, and display means for displaying information by using light of a predetermined wavelength, the information displayed by the display means being transmitted to the viewer by utilizing the light splitting surface, wherein the light splitting surface has respective different spectral characteristics with respect to light of a wavelength band including the predetermined wavelength and light of wavelengths not included in the wavelength band.

In the intra-viewfinder display device according to this invention, the light splitting surface may have two different modes. In one mode, the light splitting surface has a high reflection characteristic with respect to the light of a wavelength band including the predetermined wavelength and a high transmission characteristic with respect to the light of wavelengths not included in the wavelength band. In the other mode, the light splitting surface has a high transmission characteristic with respect to the light of a wavelength band including the predetermined wavelength and a high reflection characteristic with respect to the light of wavelengths not included in the wavelength band.

Further, in the intra-viewfinder display device according to this invention, the light of the predetermined wavelength is preferably light of a long wavelength band included in a visible range and is more preferably S-polarized light relative to the light splitting surface.

Further, in the intra-viewfinder display device according to this invention, the light splitting surface is preferably arranged to have a refractive power, and the display means is preferably arranged such that, when the light splitting surface having the refractive power is decentered with respect to the optical system, the display means provides a display including distortion so as to correct a distortion caused by the decentered state of the light splitting surface.

The above-stated object can be attained when the intra-viewfinder display device arranged in accordance with this invention is applied to a single-lens reflex camera, a still video camera or the like.

The above and other objects and features of this invention will become apparent from the following detailed description of embodiments thereof taken in conjunction with the accompanying drawings.

DETAILED DESCRIPTION OF THE INVENTION

Figure 1:
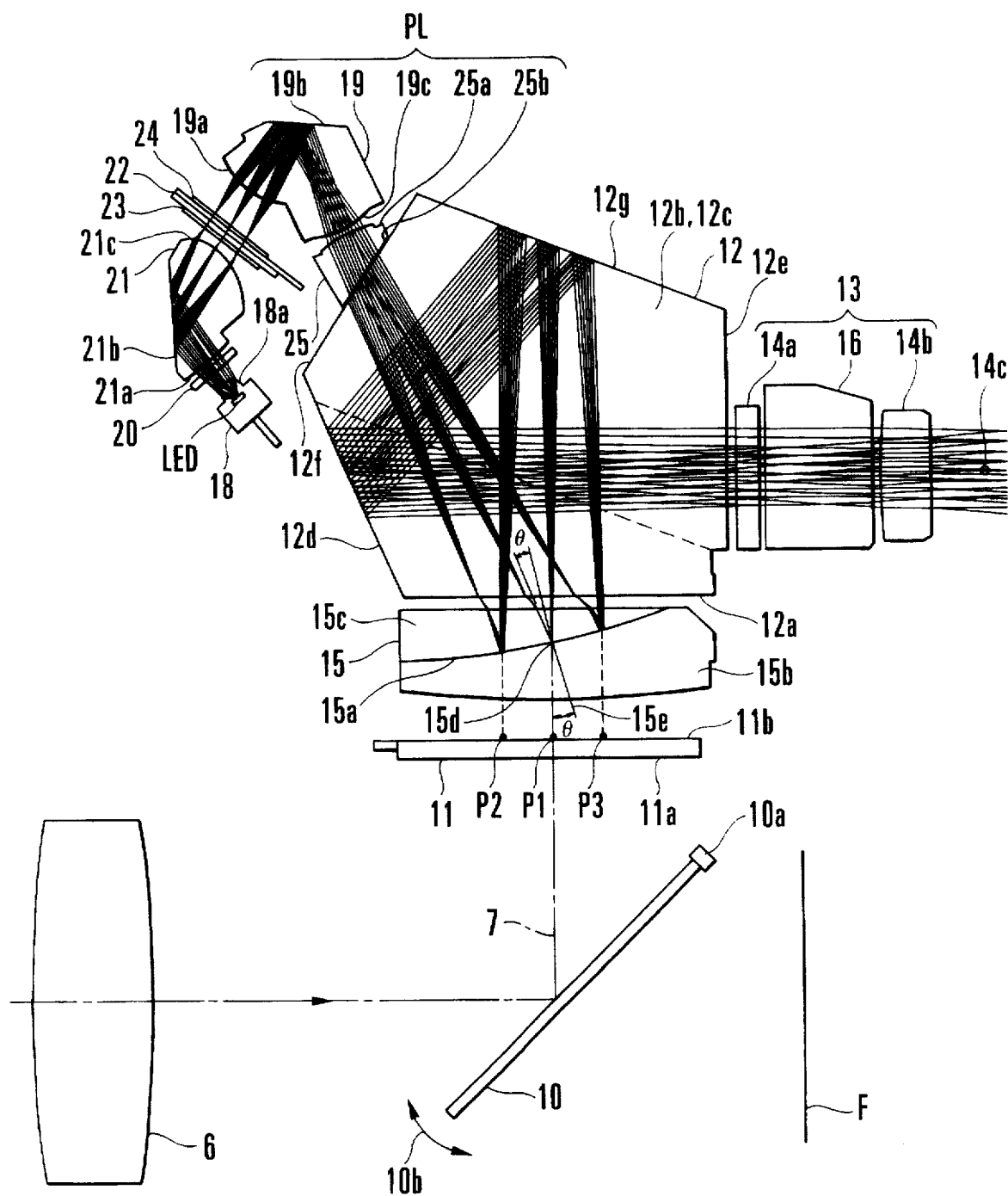
FIG. 1 is a schematic representation showing essential parts of a first embodiment of this invention.
Figure 2:
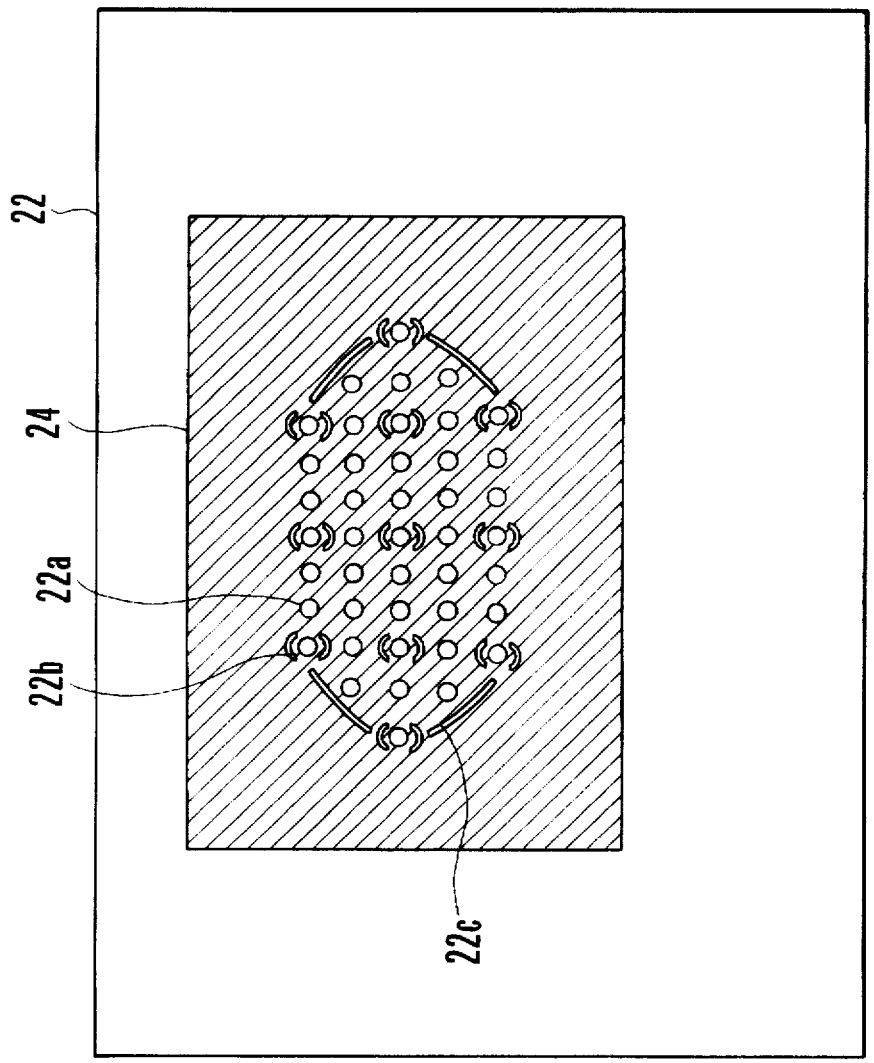
FIG. 2 shows a display part in FIG. 1.
Figure 3:
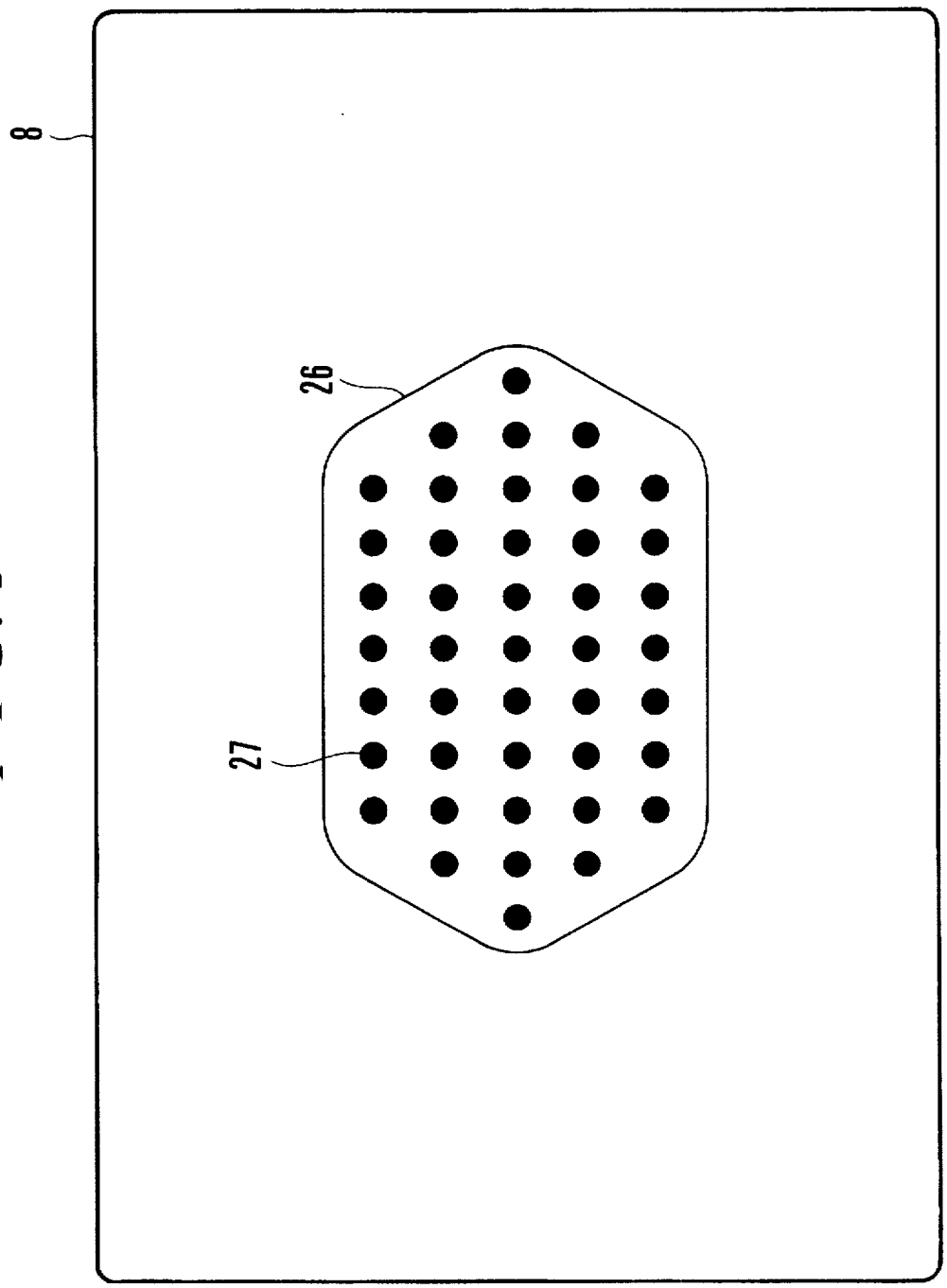
FIG. 3 shows a viewfinder field in FIG. 1.
Figure 4:
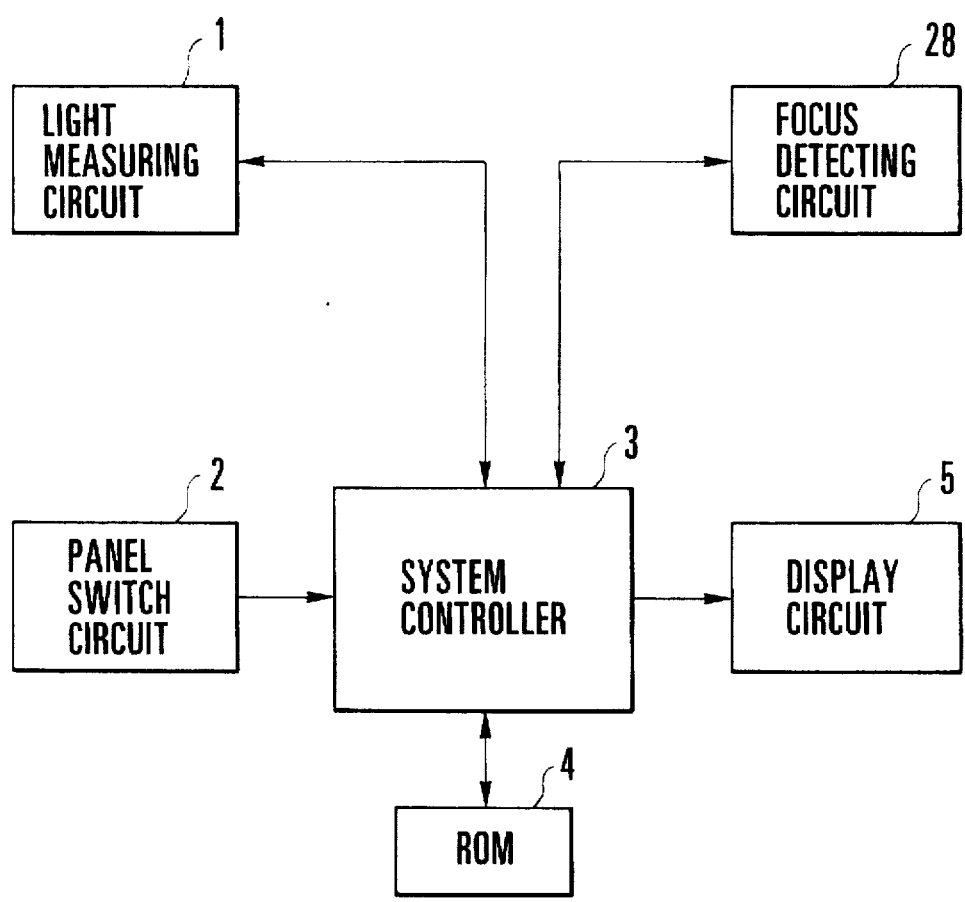
FIG. 4 is a block diagram showing a display arrangement of the first embodiment of this invention.

FIG. 1 schematically shows in a sectional view essential parts of a first embodiment of this invention. In this case, an intra-viewfinder display device arranged according to this invention is applied to a single-lens reflex camera. FIG. 2 shows a display part of the intra-viewfinder display device shown in FIG. 1. FIG. 3 shows the inside of a viewfinder field of the intra-viewfinder display device shown in FIG. 1. FIG. 4 shows how the display action is controlled in the first embodiment.

Referring to FIG. 1, a photo-taking lens 6 is arranged to form an object image, i.e., a viewfinder image, on a matt surface 11b on the light exit side of a focusing screen 11 through a movable mirror 10. The movable mirror 10 is arranged to be rotatable in the direction of arrow 10b on a rotation shaft 10a. A Fresnel lens surface 11a is formed on the light entrance side of the focusing screen 11 to collect an incident light beam.

A photosensitive surface F is, for example, a photographing film or an image sensor or the like. An object image is formed on the photosensitive surface F by the photo-taking lens 6 when the movable mirror 10 has been rotated. A condenser lens 15 is composed by cementing together two lens parts 15b and 15c. A part of a cementing surface between the lens parts 15b and 15c is not coaxial with a viewfinder optical axis 7, has a predetermined spectral transmission factor and acts as a light splitting surface 15a for splitting a light beam. A normal line 15e obtained at a point of incidence 15d of the viewfinder optical axis 7 on the light splitting surface 15a is set to be slanting at an angle θ with respect to the viewfinder optical axis 7.

The light splitting surface 15a has an optical action of reflecting and collecting a light beam coming from a display device which will be described later herein. A pentagonal prism 12 is arranged to convert the viewfinder image formed on the focusing screen 11 into an erecting image through roof surfaces 12b and 12c and a front reflecting surface 12d and to guide the erecting image to an eyepiece 13. The eyepiece 13 has two lenses 14a and 14b. A light beam splitting prism 16 is arranged to divide a light beam so as to impart the divided light beams to a light measuring device, a visual-line detecting device, etc., (not shown).

Referring further to FIG. 1, a light beam from the photo-taking lens 6 is reflected by the movable mirror 10 to form an object image on the matt surface 11b of the focusing screen 11. A light beam from the object image on the matt surface 11b enters the pentagonal prism 12 at its entrance surface 12a through the condenser lens 15. The light beam in the pentagonal prism 12 is then reflected by the roof surface 12b (12c) and the front reflecting surface 12d and exits from an exit surface 12e of the pentagonal prism 12 to enter the eyepiece 13. A viewer then views the object image on the focusing screen 11, i.e., a viewfinder image, at an eye point 14c through the eyepiece 13.

The first embodiment is arranged to enable the viewer to see, along with the viewfinder image, display information displayed by a display device in such a state that the display information is superimposed on the viewfinder image within one and the same viewfinder field. Further, a focus detecting device which is not shown is disposed in the bottom part of the camera to which light passing through the movable mirror 10 is guided downward.

The essential parts of the display device in the first embodiment are next described. An LED package 18 includes therein light emitting diodes (LEDs) arranged as an internal light source. An infrared cutting filter 20 is arranged in front of a collective lens 21. In the collective lens 21, a light beam from the infrared-cutting filter 20 is received at an entrance surface 21a having a refractive power, is reflected by an internal reflecting surface 21b and is allowed to exit from an exist surface 21c having a refractive power.

A display part 22 is composed of a TN (twist nematic) type liquid crystal display and is provided with polarizing plates 23 and 24 which are disposed on the front and reverse sides of the display part 22. Hereinafter, the display part 22 may be called also as a TN type liquid crystal display. In a projection lens 19, a light beam from the display part 22 is received at an entrance surface 19a having a refractive power, is reflected by an internal reflecting surface 19b and is allowed to exit from an exit surface 19c having a refractive power. In another projection lens 25, a light beam from the projection lens 19 is received at an entrance surface 25a having a refractive power and is allowed to exit from an exit surface 25b. The light from the projection lens 25 is guided to a transmission surface 12f of the pentagonal prism 12.

The transmission surface 12f of the pentagonal prism 12 is a surface which does not act to cause the viewfinder image formed on the focusing screen 11 to be reflected as an erecting image (i.e., non-used surface). The exit surface 25b of the projection lens 25 is arranged approximately in parallel with the transmission surface 12f of the pentagonal prism 12. The projection lenses 19 and 25 jointly constitute a projection means PL.

A light beam from the LED package 18 is caused to enter the infrared cutting filter 20, so that its visible light is allowed to pass through the infrared cutting filter 20 and is collected by the collective lens 21 to illuminate the display part 22. Display information displayed by the display part 22 is caused by the above-stated projection means PL to enter the pentagonal prism 12 at the transmission surface 12f to be imaged in the neighborhood of the entrance surface 12a of the pentagonal prism 12. The display information by the display part 22 which is thus imaged in the neighborhood of the entrance surface 12a is reflected by the light splitting surface 15a of the condenser lens 15 and is caused to enter the eyepiece 13 through the pentagonal prism 12.

In this instance, the display information by the display part 22 which is imaged in the neighborhood of the entrance surface 12a of the pentagonal prism 12 forms a virtual image approximately at the optically same position (conjugate position) as the matt surface 11b of the focusing screen 11. Accordingly, the viewer is enabled to observe through the eyepiece 13 both the viewfinder image on the focusing screen 11 and the display information by the display part 22 in a superimposed state at the same viewfinder diopter.

In the first embodiment, the elements 18 to 25 are component elements of a display device. The group of elements from the display part 22 through the projection means PL, the pentagonal prism 12, the light splitting surface 15a of the condenser lens 15 and the pentagonal prism 12 to the eyepiece 13 are component elements of a display system.

The display action of the display part 22 in the first embodiment is next described as follows. FIG. 4 is a block diagram showing how the display device in the first embodiment is controlled. Referring to FIG. 4, a light measuring circuit 1 is arranged to measure luminance by finely dividing a photographing picture plane into a matrix state. A focus detecting circuit 28 is arranged to have a number of focusing points (distance measuring areas) within a photographing field. A panel switch circuit 2 is arranged to designate a particular focusing point. A display circuit 5 includes the above-stated TN type liquid crystal display 22 and is arranged to display the designated focusing point within the viewfinder field. A system controller 3 is arranged to control the focus detecting circuit 28, the light measuring circuit 1, the display circuit 5, etc.

The system controller 3 is arranged to adjust the focus of the photo-taking lens 6 according to a defocus state obtained at a position corresponding to the focusing point designated by the panel switch circuit 2 and to carry out a light measuring computation for a light measuring area corresponding to the designated focusing point. The system controller 3 is further arranged to cause the position of the designated focusing point to be displayed in a superimposed state at a luminance level based on the measured and computed light value. In other words, among the focusing points which can be displayed, only a focusing point currently necessary is caused to be lit up. A ROM 4 is arranged to store correction values to be used for correcting inconstancy of sensitivity of the light measuring elements at the time of light measuring computation.

The operation of the display device in the first embodiment is next described with reference to FIGS. 1 to 3. Roles to be played by the above-mentioned various optical elements are first described as follows.

(i) The light splitting surface 15a of the condenser lens 15 projects an image of the eyepiece 13 or the eye point 14c inside the projection means PL.

(ii) The collective lens 21 and a dome part 18a of the LED package 18 project an image of the LED approximately inside the projection means PL.

(iii) The projection lenses 19 and 25 (the projection means PL) form an image of display segments of the TN type liquid crystal display 22 in front of the condenser lens 15.

Next, description will be serially given below beginning with the LED package 18. A light beam emitted from the LED serving as a light source exits from the dome part 18a provided in the fore end part of the LED package 18. A visual light component of the light beam allowed to pass through the infrared cutting filter 20 is guided to the collective lens 21. An infrared component of the LED light is thus removed by the infrared cutting filter 20.

The collective lens 21 has two optically effective convex surfaces 21a and 21c and one plane surface 21b. In the collective lens 21, a light beam enters and converges at the convex surface (entrance surface) 21a, is totally reflected by the plane surface 21b to be deflected toward the TN type liquid crystal display 22, and exits from the convex surface (exit surface) 21c to be incident on the TN type liquid crystal display 22. The collective lens 21 thus acts to enable the light of LED illuminating the TN type liquid crystal display 22 to efficiently form the display information which will be described later herein.

The TN type liquid crystal display 22 is provided with an orientating film formed to twist 90 degrees the liquid crystal molecules of the TN type liquid crystal display 22. This arrangement imparts a 90° optical rotating power to the TN type liquid crystal display 22 when no voltage is applied thereto. Further, with the polarizing axes of the polarizing plates 23 and 24 stuck to the TN type liquid crystal display 22 arranged to be in parallel with each other, a so-called negative display operation mode in which light is allowed to pass only the display segments to which a voltage is applied can be attained by the action of the 90° optical rotating power of the TN type liquid crystal display 22 in conjunction with the actions of the polarizing plates 23 and 24.

FIG. 2 is a plan view showing the TN type liquid crystal display 22 as viewed from the side of the projection lens 19. Referring to FIG. 2, display segments 22a, 22b and 22c are arranged to permit an electric field to be applied to each of them independently of others for use of them as a display body indicating a distance measuring area, a light measuring position or the like. In the case of FIG. 2, the TN type liquid crystal display 22 is shown in a state of having a voltage applied to all of the display segments thereof. Light from the display body is guided to the eyepiece 13 through the light splitting surface 15a of the condenser lens 15 which is not coaxial with the viewfinder optical axis 7. Distortion, therefore, arises in the display information. The distortion is corrected by conversely distorting the arrangement of the display segments in such a way as to show the image of the display information in a state of being accurately aligned both in the vertical and horizontal directions as viewed through the viewfinder system.

In the first embodiment, what is purported by the display body is the position of a focusing point. The display segments 22a are arranged to cover each of a total of 43 focusing points. The display segments 22b are arranged to indicate focusing points which are controllable by the output of a visual-line detecting device. The display segments 22c are arranged to indicate the whole range of all the focusing points.

A light beam having passed through the TN type liquid crystal display 22 enters the projection lens 19 at the convex surface 19a and is reflected by the plane surface 19b coated with a reflecting film formed by vapor deposition of aluminum. The reflected light beam is then allowed to exit from the convex surface 19c of the projection lens 19. The light beam next enters the projection lens 25, which constitutes the projection means PL in conjunction with the other projection lens 19 and the TN type liquid crystal display 22. Images of the display segments 22a, 22b and 22c of the TN type liquid crystal display 22 are projected onto the vicinity of the entrance surface 12a of the pentagonal prism 12a in an enlarged state by the converging action of the convex surfaces 19a and 19c of the projection lens 19 and the convex surface 25a of the projection lens 25. In other words, an image of the display body is formed there.

The light beam having passed through the pentagonal prism 12 next enters the condenser lens 15. The condenser lens 15 is composed by locally applying a dielectric film by vapor deposition to each of glass pieces which are machined into shapes of being divided at the light splitting surface 15a, and cementing together the glass pieces.

The light splitting surface 15a of the condenser lens 15 is formed as a spherical surface, the center of which is located not on the viewfinder optical axis 7. The light splitting surface 15a is thus arranged to be not coaxial with the viewfinder optical system. In other words, the light splitting surface 15a has an inclination. The inclination of the light splitting surface 15a is utilized for reflecting the light from the LED obliquely emitted inward from the plane surface 12f of the pentagonal prism 12, which does not function to form the viewfinder optical path, in a direction along the viewfinder optical axis 7. The light splitting surface 15a also serves as a field mirror to project the image of the eyepiece 13 or the eye point 14c into the projection means PL. The projected light is then introduced via the plane surface 12f into the pentagonal prism 12. The projected light is therefore in an almost normal relation to the condenser lens 15. Therefore, the area of the vapor deposition can be arranged to cover a wider area without much increasing the size of the condenser lens 15.

As mentioned above, the images of the display segments are formed in the neighborhood of the entrance surface 12a of the pentagonal prism 12. The light beams converged there are reflected by the light splitting surface 15a of the condenser lens 15 and, then, gradually converge. Considering apparent image forming positions by conversely tracing the light beams and letting them pass through the light splitting surface 15a, the image forming positions become points P1, P2 and P3 on the focusing screen 11 as shown in FIG. 1. When these images are viewed through the viewfinder optical system, the display segments on the TN type liquid crystal display 22 appear as if they are located on the focusing screen 11 in an enlarged state. The image of the display body of the TN type liquid crystal display 22 is thus displayed in a state of overlapping the object image on the focusing screen 11, so that the superimposed display is attained.

FIG. 3 shows the state of images of display segments as viewed through the viewfinder field in the first embodiment. In the case of FIG. 3, all the display segment images 27 indicating the focusing points are displayed, by way of example, as a display pattern. In FIG. 3, reference numeral 8 denotes a viewfinder field, and reference numeral 26 denotes a boundary line of a light splitting part formed on the light splitting surface 15a of the condenser lens 15. The inside of the boundary line 26 serves as a light splitting surface coated with a dielectric film by vapor deposition, and the outside of the boundary line 26 serves as a transparent part. The display segment images 27 are the images of the display segments 22a of the TN type liquid crystal display 22.

The display area can be arranged to occupy a wide area on the focusing screen 11, as shown in FIG. 3, since the light splitting surface 15a of the condenser lens 15 acts to converge a reflected light, so that the light beams can be condensed at the projection means PL to permit the projection means PL to be configured in a small size. The refractive power of the light splitting surface 15a is then set in such a way as to have the image of the eyepiece 13 or the eye point 14c projected to the inside of the projection means PL, thereby reducing the size of the whole device.

In the first embodiment, the light splitting surface 15a of the condenser lens 15 is arranged to have a spherical shape. However, the spherical shape may be replaced with an aspherical shape having its curvature in the same direction as that of the spherical shape.

Figure 5:
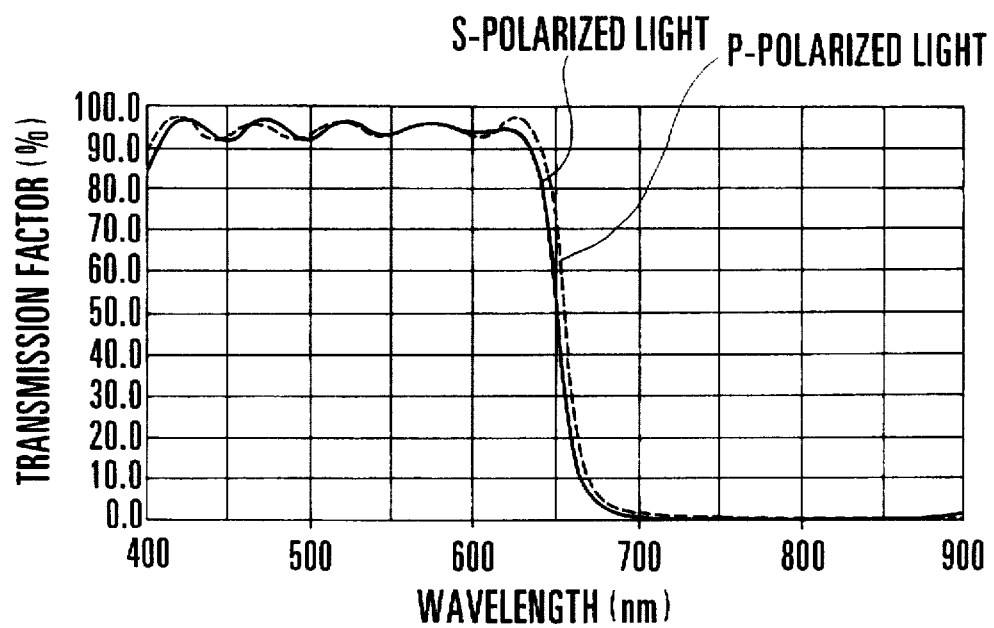
FIG. 5 shows the spectral transmission factor of a light splitting surface of a condenser lens in FIG. 1.

The spectral characteristics of the light splitting surface 15a of the condenser lens 15 are next described. FIG. 5 shows the spectral transmission factor characteristic of the light splitting surface 15a of the condenser lens 15. The angle of incidence of a light beam on the light splitting surface 15a is set at the angle θ shown in FIG. 1. In FIG. 5, the curves of S-polarized light and P-polarized light related to a ray of light within the paper surface of FIG. 1 are shown by a full line and a broken line, respectively.

The transmission factor of the S-polarized light is about 50% at a wavelength of 650 nm and is about 95%, which is very high, at wavelengths shorter than 650 nm. On the side of wavelengths longer than 650 nm, the transmission factor of the S-polarized light is almost 0%. The transmission factors of the P-polarized light show a characteristic which is obtained by shifting the characteristic of that of the S-polarized light about 5 nm to the longer wavelength side. Generally, dielectric multilayer films do not absorb light and have a spectral reflection factor characteristic obtained by inverting the scales 0 and 100 of the ordinate axis. Therefore, among the components of the object light having passed through the focusing screen 11, the light components of a visible range of wavelengths below 650 nm or thereabout are allowed to reach the pentagonal prism 12 disposed behind the focusing screen 11. All the light components that are of wavelengths longer than 650 nm or thereabout are cut off.

Figure 7:
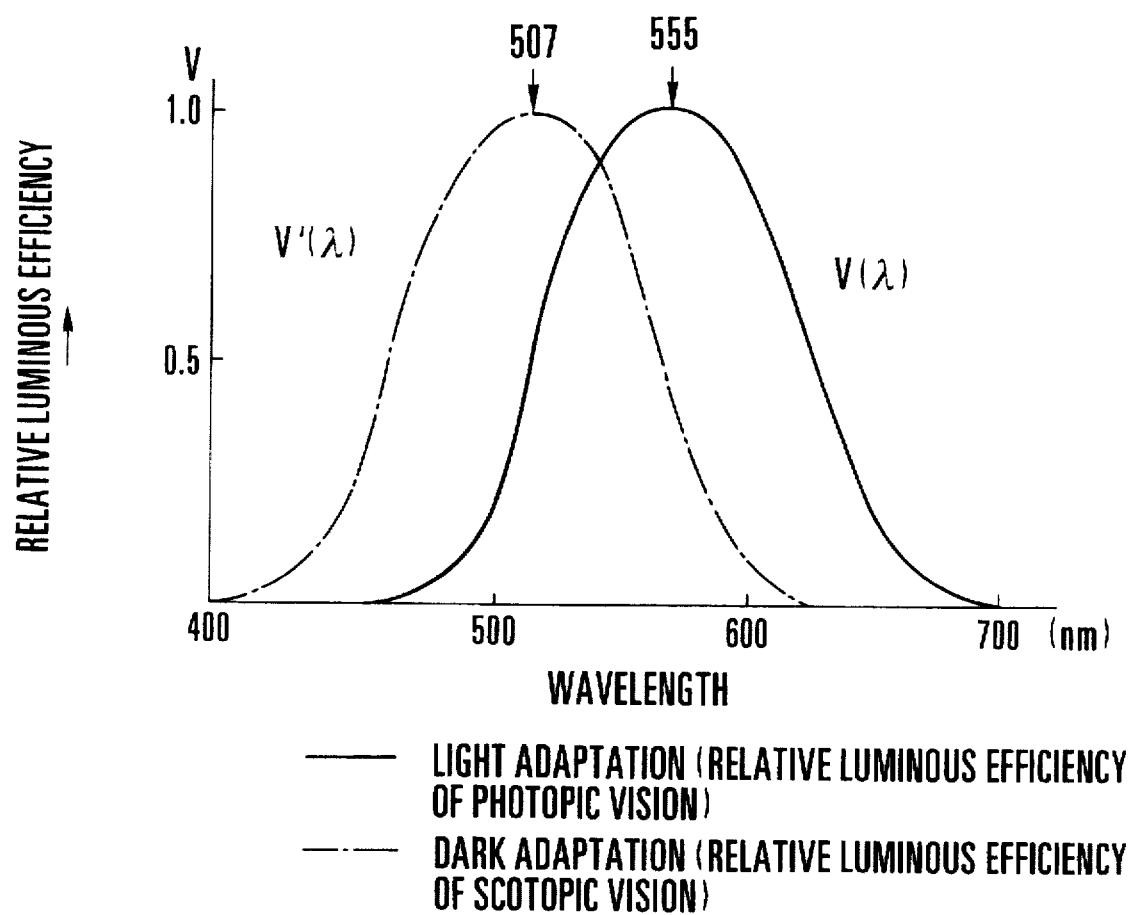
FIG. 7 shows relative luminous efficiency curves.

How the object image obtained through the condenser lens 15 appears to the human eye varies with the sensitivity characteristic of the human eye. FIG. 7 shows the relative luminous efficiency of the human eye. In FIG. 7, the relative luminous efficiency of photopic vision is shown in a full line curve and that of scotopic vision is shown in a one-dot chain line curve. Considering the circumstances under which cameras are used in general, paying attention only to the characteristic of photopic vision suffices. As shown in FIG. 7, the wavelength of a red color above the wavelength of 650 nm is at the end of the visual range and, for such a wavelength, the luminance efficiency is considerably low. In actuality, when the object image is viewed by cutting this region of wavelengths, the viewfinder image appears untinged and its color is almost the same as the actual color of the object. Besides, since a major portion of the light quantity is transmitted, the luminance of the viewfinder image is never lowered by the condenser lens 15.

Figure 6:
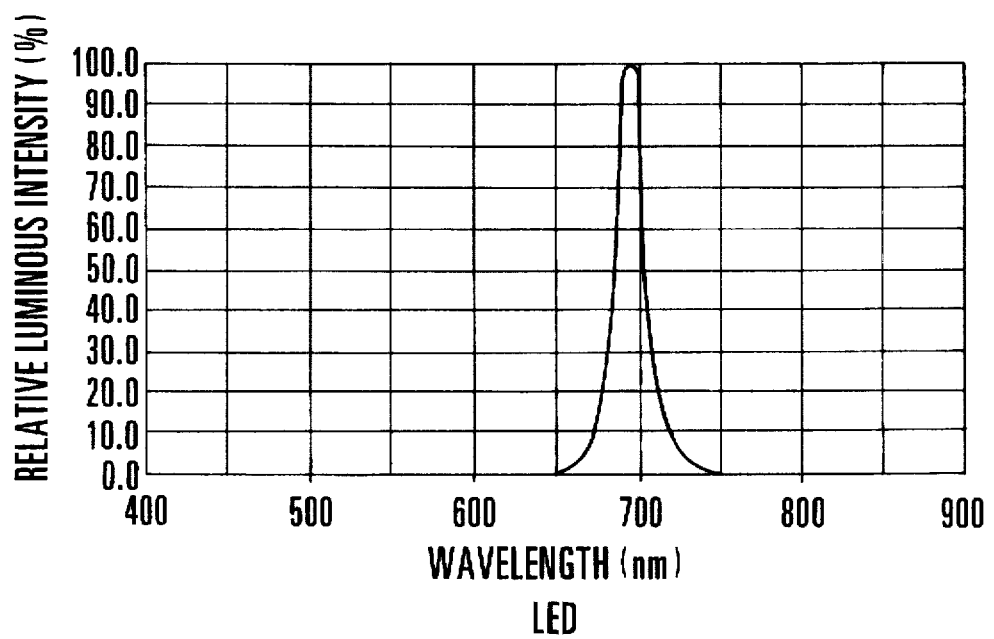
FIG. 6 shows the luminous intensity of an LED package included in the first embodiment shown in FIG. 1.

However, since the human eye is not totally insensitive to the light of wavelengths above 650 nm, an intense incident light is visible as red even if the light is in this region of wavelengths. The display system in this embodiment is arranged to use the LED package 18 which has a luminous intensity as shown in FIG. 6, by taking the advantage of this characteristic of the human eye. As shown in FIG. 6, the LED in the LED package 18 has a peak of intensity at a wavelength of 695 nm, and the breadth of the intensity is about 40 nm before and after the peak. For this wavelength, the transmission factor of the light splitting surface 15a of the condenser lens 15 is almost 0%, that is, its reflection factor for this wavelength is approximately 100%.

In the first embodiment, as described above, the dielectric film which has a higher reflection factor in the long wavelength part of the visible range than in the middle part of the visible range is used for the light splitting surface 15a of the condenser lens 15. By virtue of this, a red color light coming from the LED package 18 can be efficiently reflected and deflected by the light splitting surface 15a to the viewfinder optical path.

The polarization direction of the polarizing plates 23 and 24 is set in such a way as to convert the light having passed through the TN type liquid crystal display 22 shown in FIG.

1 into an S-polarized light. Compared with P-polarized light, S-polarized light gives lower transmission factors, i.e., higher reflection factors, for wavelengths including even short wavelengths. Therefore, a red light emitted from the LED package 18 is efficiently reflected by the light splitting surface 15a.

The image forming action of the projection means PL for the display pattern is next described with reference to FIGS. 8 and 9. As mentioned above, the light from the TN type liquid display 22 is guided to the eyepiece 13 through the light splitting surface 15a of the condenser lens 15, which is not coaxial with the viewfinder optical axis 7. Therefore, a distortion takes place with no axial symmetry in the image of the display information. Further, since the projection lenses 19 and 25 shown in FIG. 1 are in complex shapes, it is apposite to form them by injection molding with an acrylic resin or the like. However, the injection molding results in occurrence of lateral chromatic aberration and longitudinal chromatic aberration. It is extremely difficult to solve these two problems by improving the projection means PL. In view of that, the display device in the first embodiment is arranged to solve the former problem by appositely setting the shape of the pattern on the TN type liquid crystal display 22 and to solve the latter problem by appositely setting the wavelength of its display light.

Figure 8:
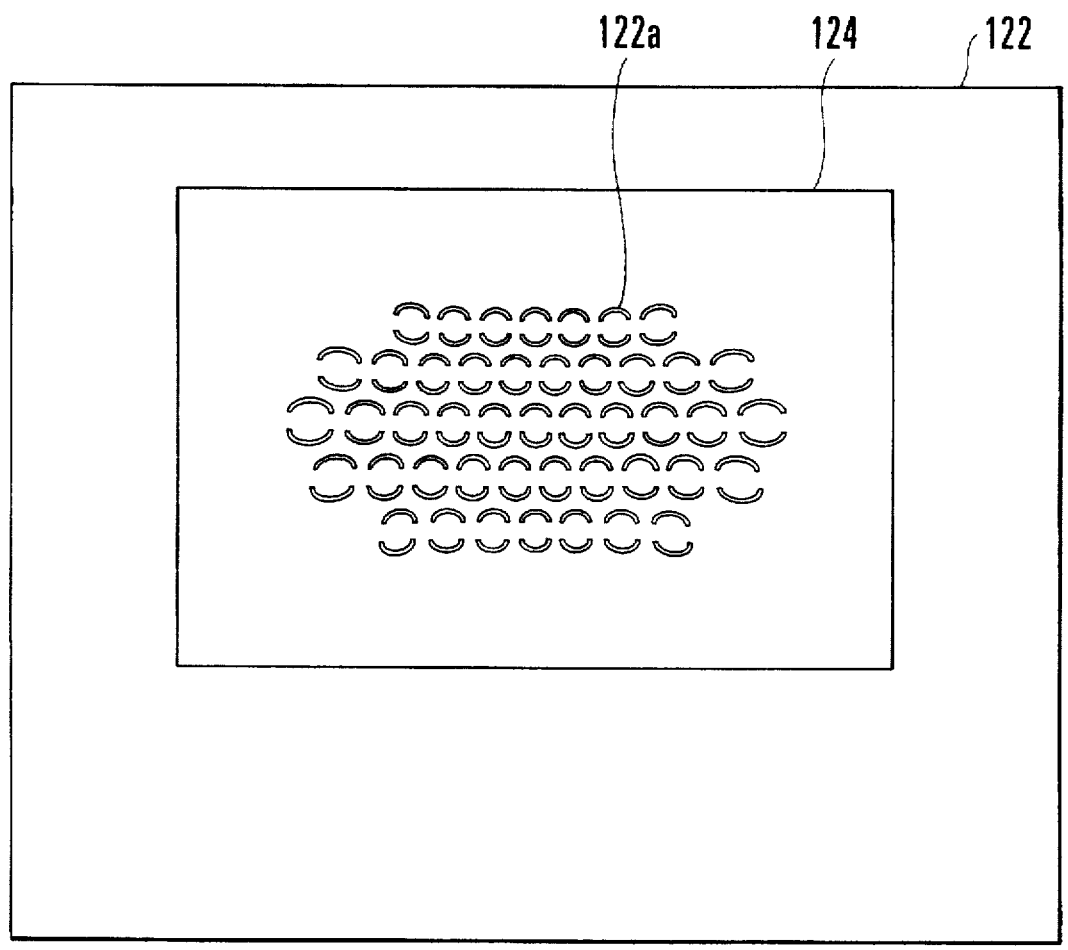
FIG. 8 shows a display pattern obtained by a display device arranged according to this invention.

FIG. 8 shows the shape of the display body on the TN type liquid crystal display 22. In this case, the display body is formed differently from the case described in the foregoing with reference to FIG. 2. In FIG. 8, reference numeral 122 denotes a TN type liquid crystal display. Reference numeral 122a denotes a group of display segments which are arranged to permit individual application of an electric field to them independently of each other and to have different shapes according to their positions. In the case of FIG. 8, the TN type liquid crystal display 122 is shown in a state of having a voltage applied to all of the display segments 122a. Reference numeral 124 denotes a polarizing plate. To make the display segments 122a appear as display patterns of the same shape when they are viewed through the viewfinder optical system, the display segments of the display body on the TN type liquid crystal display 122 are shaped according to the distortion taking place in the display system in such a way as to correct the distortion.

Figure 9:
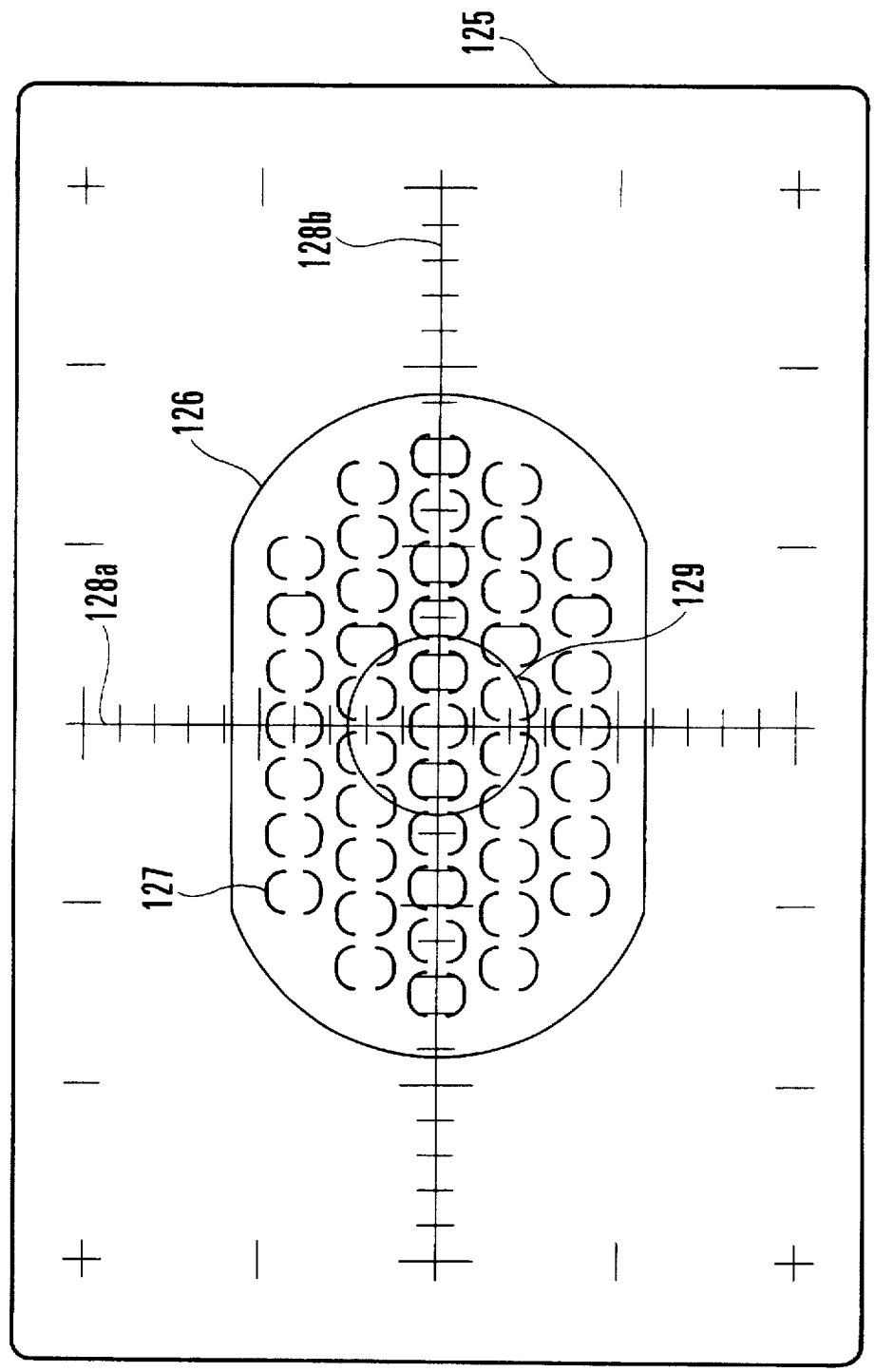
FIG. 9 shows a viewfinder field obtained in the first embodiment of this invention.

FIG. 9 shows the viewfinder field. In FIG. 9, reference numeral 125 denotes a viewfinder field. Reference numerals 128a and 128b denote graduation lines formed on the focusing screen 11. Reference numeral 129 denotes a light measuring range mark formed also on the focusing screen 11. Reference numeral 126 denotes a boundary line of the light splitting surface 15a of the condenser lens 15. The inside of the boundary line 126 is formed as the light splitting surface 15a with a dielectric film vapor-deposited. The viewfinder field 125 has a transparent part outside the boundary line 126. Reference numeral 127 denotes display images of the display segments 122a of the TN type liquid crystal display 122. As shown in FIG. 8, patterns of the display segments 122a on the TN type liquid crystal display 122 are more elongated outward accordingly as they are located further away from a central position. In addition to that, they are arranged a little asymmetric in the vertical direction as viewed in the drawing. In other words, they are arranged in such a way as to appear as the display patterns 127 of the same shape on the viewfinder field 125, as shown in FIG. 9. Further, with regard to the second problem relative to chromic aberrations, the light to be emitted from the LED package 18 is arranged to have a dominant wavelength of 690 nm or thereabout in such a way as to correct the chromic aberrations in question.

The wavelength of the display light is next described as follows. With the LED package 18 which has the luminous intensity characteristic as shown in FIG. 6 used in combination with the light splitting surface 15a of the condenser lens 15 which has the spectral transmission factor characteristic as shown in FIG. 5, almost all the light components reach the eye of the viewer, although a small marginal part on the short wavelength side of the light emission wavelengths is not reflected by the light splitting surface 15a of the condenser lens 15 and thus fails to reach the eye. However, although the luminous efficiency of the human eye greatly lowers around a wavelength of 700 nm as shown in FIG. 7, the wavelengths around it is still visible if the light has a high degree of intensity. More specifically, as shown in numerical data in Table 1, the relative luminous efficiency of the light adaptation at a wavelength of 690 nm is 0.0082. The luminous efficiency diminishes by about ½ with the wavelength increasing by 10 nm around this wavelength. The peak of visible display light is at the wavelength of 690 nm or thereabout which is a little shorter than the peak of the luminous intensity.

The wavelength zone of the display light is thus restricted to a considerably narrow range with its short wavelength side limited by the spectral transmission factor characteristic of the light splitting surface 15a of the condenser lens 15 and with its long wavelength side limited by the limit of the luminous efficiency. By virtue of this arrangement, the problem concerning the chromic aberrations of the projection optical system is effectively suppressed to a negligible level.

Figure 14:
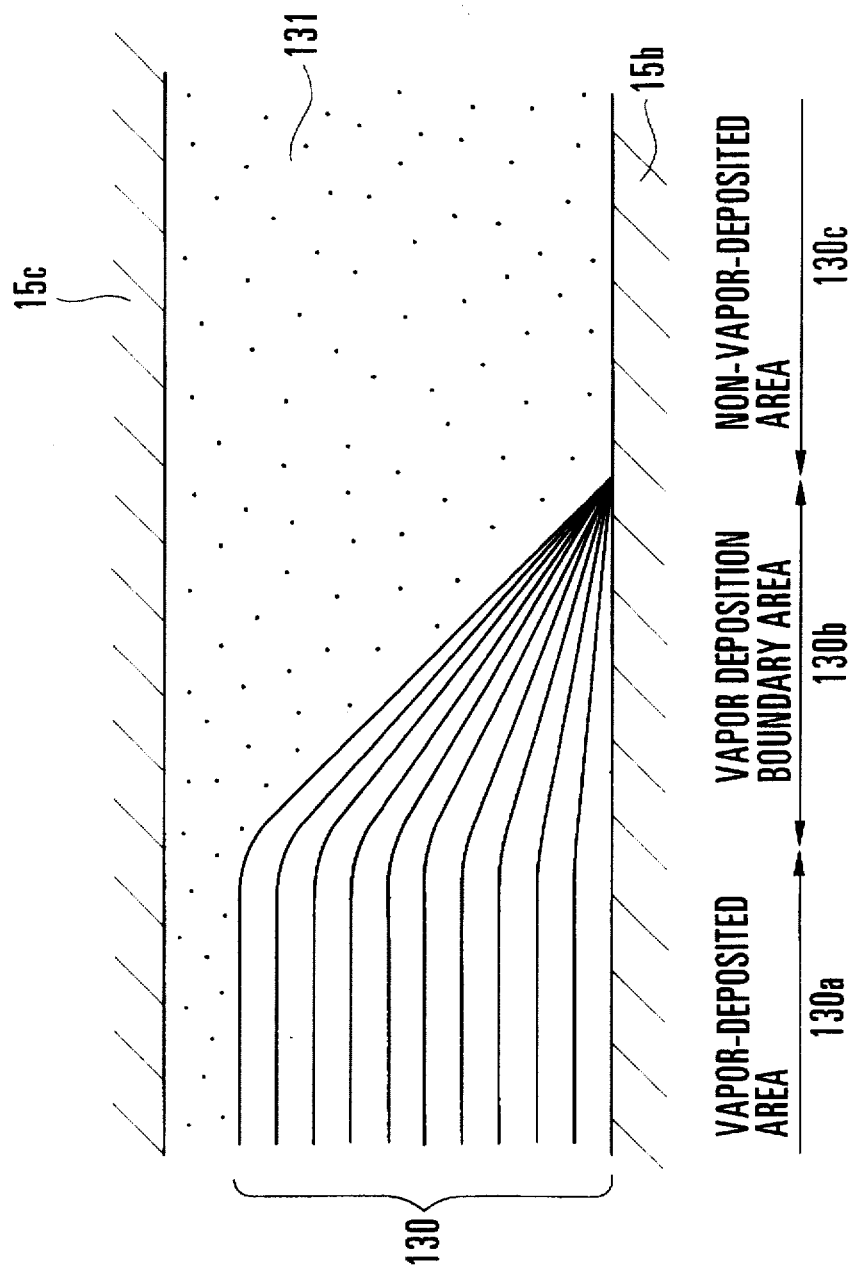
FIG. 14 is a sectional view showing essential parts of a light splitting surface arranged in accordance with this invention.

FIG. 14 is an enlarged sectional view showing a cementing part between the lens parts 15b and 15c which constitute the condenser lens 15. In FIG. 14, reference numeral 130 denotes a dielectric multilayer film which determines the spectral transmission factor characteristic of the light splitting surface 15a of the condenser lens 15. Reference numeral 131 denotes a layer of an adhesive agent for cementing together the lens parts 15b and 15c. The condenser lens 15 is composed by sticking the lens part 15b to the lens part 15c by means of the adhesive agent 131 after the dielectric multilayer film 130 is partially vapor-deposited on the lens part 15b. The length of a vapor deposition boundary area 130b in which the film thickness of the dielectric multilayer film 130 is gradually changed is controlled as desired by setting at a suitable thickness the end face of a mask which is used for partial vapor deposition. The vapor deposition boundary area 130b is viewed as the boundary line 26 or 126 in FIG. 3 or 9. A vapor-deposited area 130a in which the thickness of the dielectric multilayer film 130 is uniform corresponds to the inside of the boundary line 26 or 126 shown in FIG. 3 or 9. A non-vapor-deposited area 130c which does not include the dielectric multilayer film 130 corresponds to the outside of the boundary line 26 or 126 shown in FIG. 3 or 9.

The spectral transmission factor characteristic of the vapor deposition boundary area 130b differs from that of the vapor-deposited area 130a shown in FIG. 5 and is in a shape of being shifted to the short wavelength side as a whole accordingly as the film thickness decreases. It is, therefore, possible to arrange the transmission factor for visible light of this part to be considerably low. As a result, when the vapor deposition boundary area 130b is viewed through the viewfinder system, it is visible as a clear black line. With the vapor deposition boundary area 130b arranged in this manner, the display device can be very simply arranged to be capable of providing a display in a high contrast and with a high degree of visibility.

A feature of the display segments in the TN type liquid crystal display 22 is next described with reference to FIGS. 15 to 18 as follows. When a focusing point is set at the intersection of the graduation lines 128a and 128b which are center lines of the viewfinder field, or when a focusing point is set where its center coincides with the center of a light measuring range mark 129, a discrepancy between the two is made to be less conspicuous by displaying each focusing point not in a closed shape of pattern but in a shape of being divided into two parts either in the vertical direction or in the horizontal direction.

Figure 17:
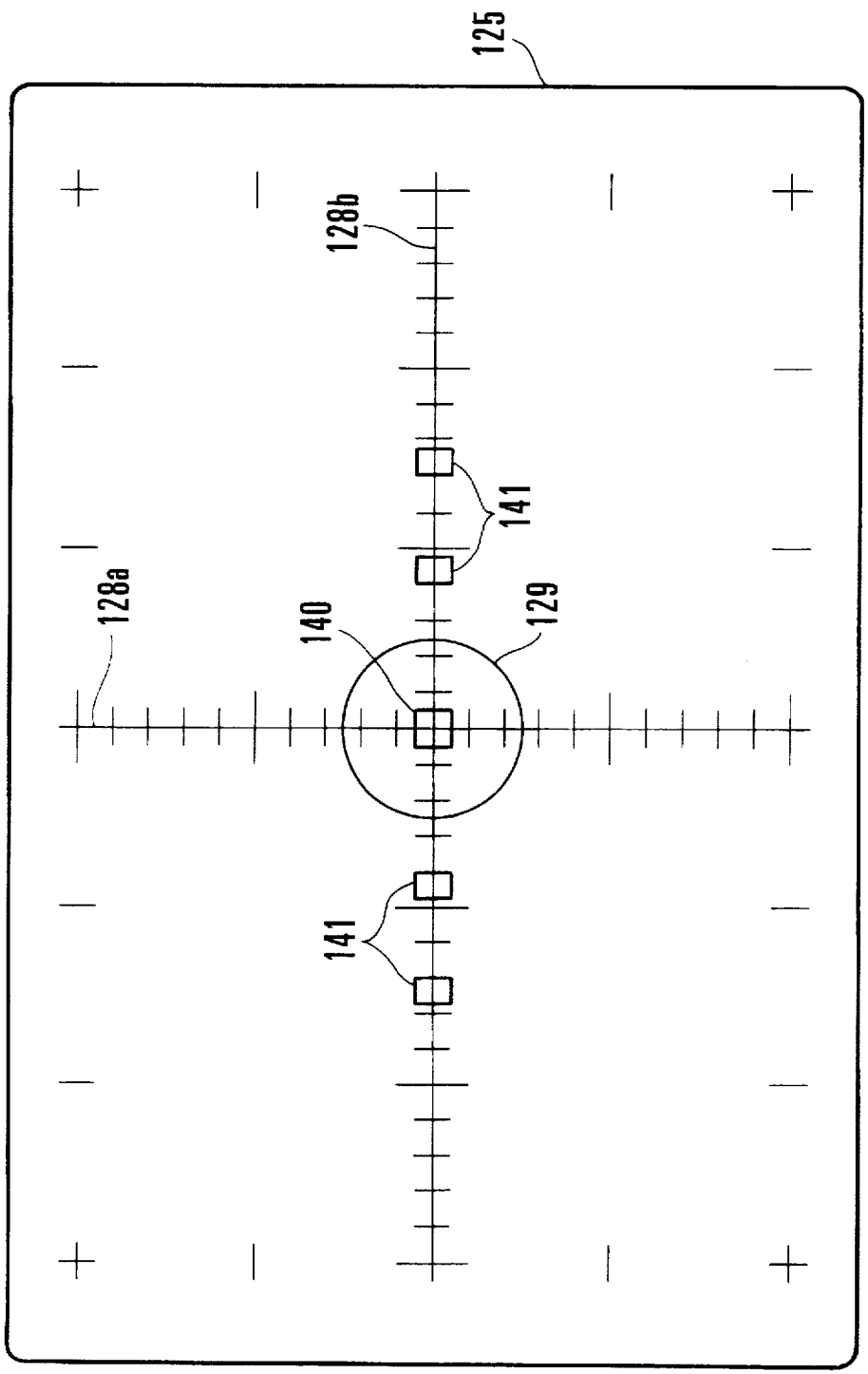
FIG. 17 shows a conventional display pattern.
Figure 18:
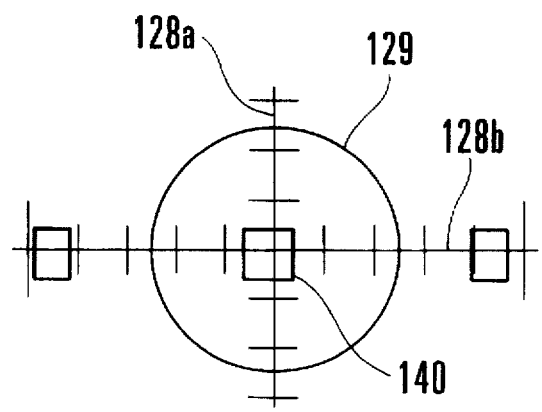
FIG. 18 shows another conventional display pattern.

In the cases of FIGS. 17 and 18, the display is made showing each of the focusing points in a closed pattern. In FIG. 17, graduation line parts are identical with those shown in FIG. 9. A focusing point 140 in the center of the viewfinder field 125 is in a square shape. Focusing points 141 located in peripheral parts are shown in a rectangular shape. FIG. 18 shows in an enlarged view the central part of the viewfinder field 125 shown in FIG. 17. In FIG. 18, the viewfinder field 125 is shown in a state of having the position of the focusing point 140 deviating a little from the graduation lines 128a and 128b provided on the focusing screen 11 both in the vertical and horizontal directions.

Figure 15:
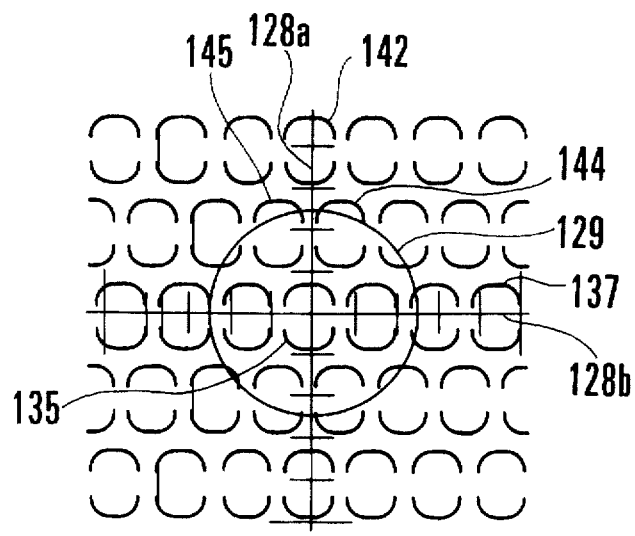
FIG. 15 shows a display pattern obtained in accordance with this invention.
Figure 16:
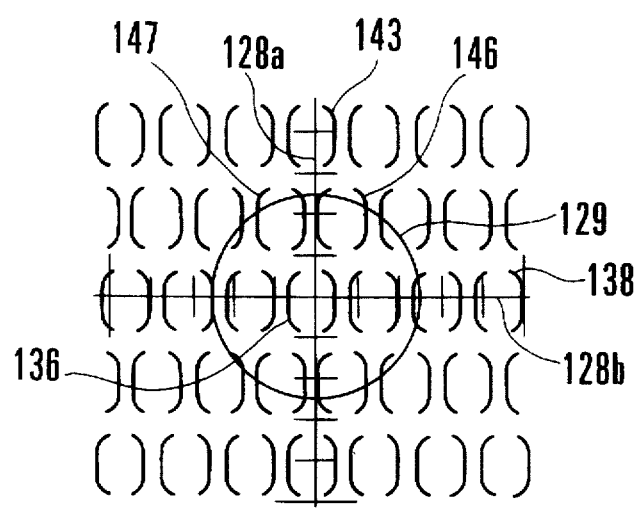
FIG. 16 shows another display pattern obtained in accordance with this invention.

FIGS. 15 and 16, on the other hand, show the case where the shape of each display pattern is divided into two parts. As in FIG. 18, FIGS. 15 and 16 show only the central part of the viewfinder field in an enlarged state. Each display pattern is divided into two parts in the vertical direction in the case of FIG. 15 and in the horizontal direction in the case of FIG. 16. In either cases, the positional deviation of a central focusing point 135 or 136 is less conspicuous than in the case of FIG. 18. The display patterns are divided in this manner for the purpose of causing visual sensations to be prevented by separated ends from readily comparing with each other the four parts of the display pattern divided by the graduation lines.

Considering the focusing points in relation to the graduation lines 128a and 128b, vertical deviation of the focusing points 137 or 138 from the graduation line 128b is not conspicuous. However, visual sensations in the horizontal direction differ from visual sensations in the vertical direction. The difference in visual sensations makes the deviation from the vertical graduation line 128a of the focusing point 143 which is in the horizontally divided shape appear more conspicuous than that of the focusing point 142 which is in the vertically divided shape.

Further, with respect to the display patterns 144 and 145 or the display patterns 146 and 147 which are adjacently arranged across the vertical graduation line 128a, the deviation of the display patterns 144 and 145 each of which is in the vertically divided shape is less conspicuous than that of the display patterns 146 and 147 each of which is in the horizontally divided shape.

Therefore, the display pattern in the shape of being divided into two parts (elements) as shown in FIG. 15 or 16 is preferable to the display pattern of the closed shape. Further, the display pattern in the shape of being vertically divided as shown in FIG. 15 is more preferable than the display pattern shown in FIG. 16.

Figure 10:
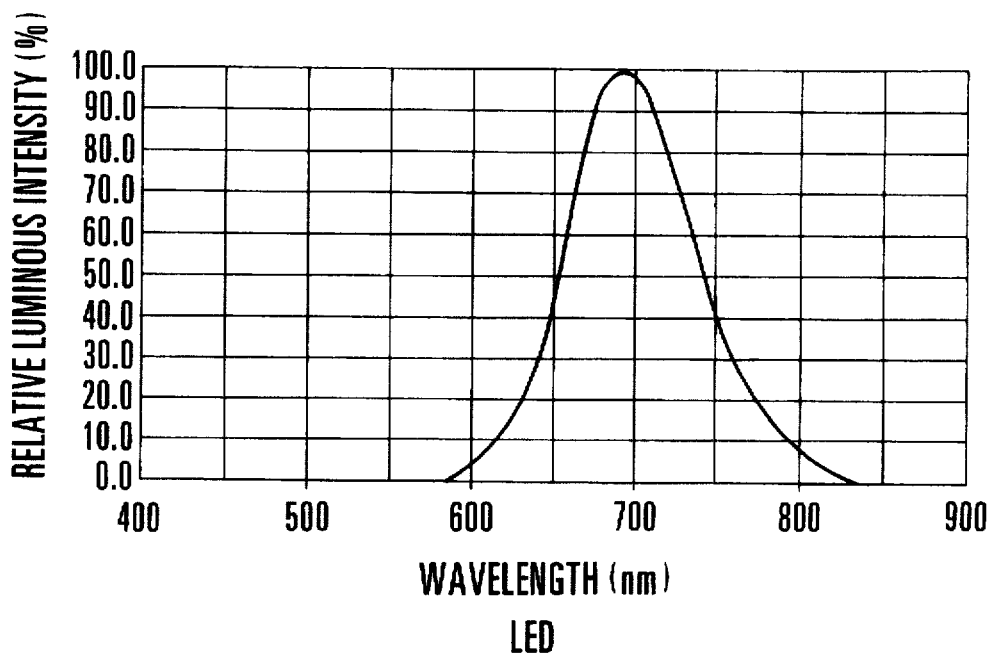
FIG. 10 shows the luminous intensity of an LED package included in a second embodiment of this invention.
Figure 11:
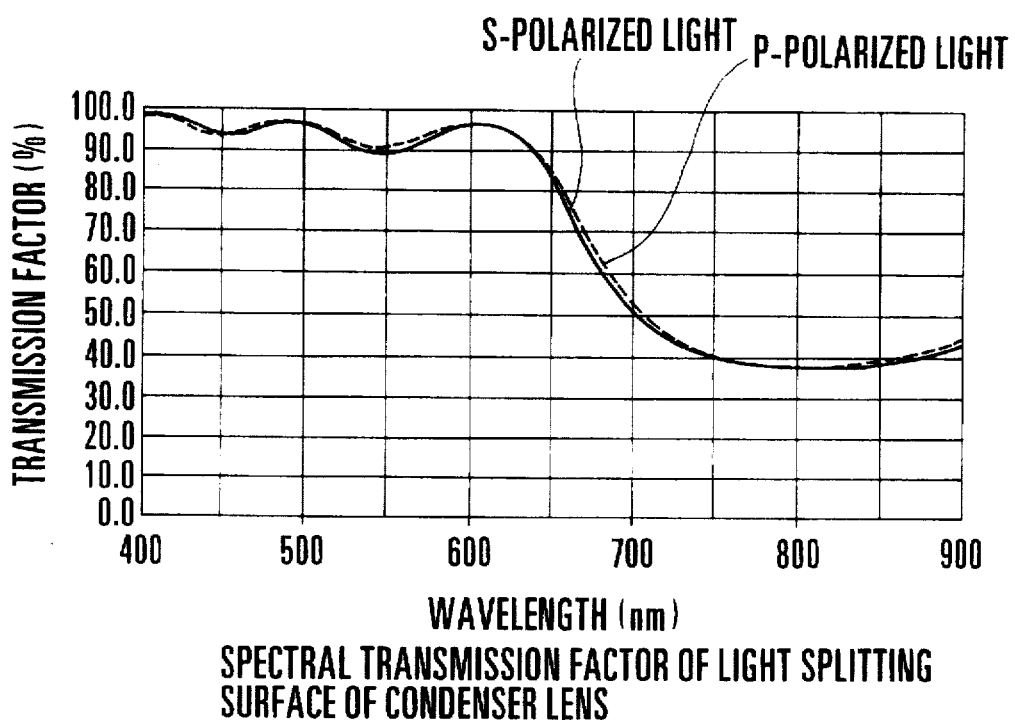
FIG. 11 shows the spectral transmission factor of a light splitting surface of a condenser lens included in the second embodiment of this invention.

A second embodiment of this invention is next described. The luminous intensity characteristic of the LED package 18 illuminating the TN type liquid crystal display 22 and the spectral transmission factor characteristic of the light splitting surface 15a of the condenser lens 15 are not limited to the characteristics employed in the first embodiment. For example the LED package 18 may be arranged to have a luminous intensity characteristic as shown in FIG. 10, and the light splitting surface 15a of the condenser lens 15 may be arranged to have a spectral transmission factor characteristic as shown in FIG. 11. The spectral reflection factor characteristic of the light splitting surface 15a of the condenser lens 15 is acceptable as long as the reflection factor at wavelengths from 650 nm to 720 nm in the end part of the visible wavelength range is set to be higher than the reflection factor obtained at the middle part of the visible wavelength range. With the second embodiment arranged in this manner, a superimposed display can be provided in a red color without tingeing the viewfinder image.

Figure 12:
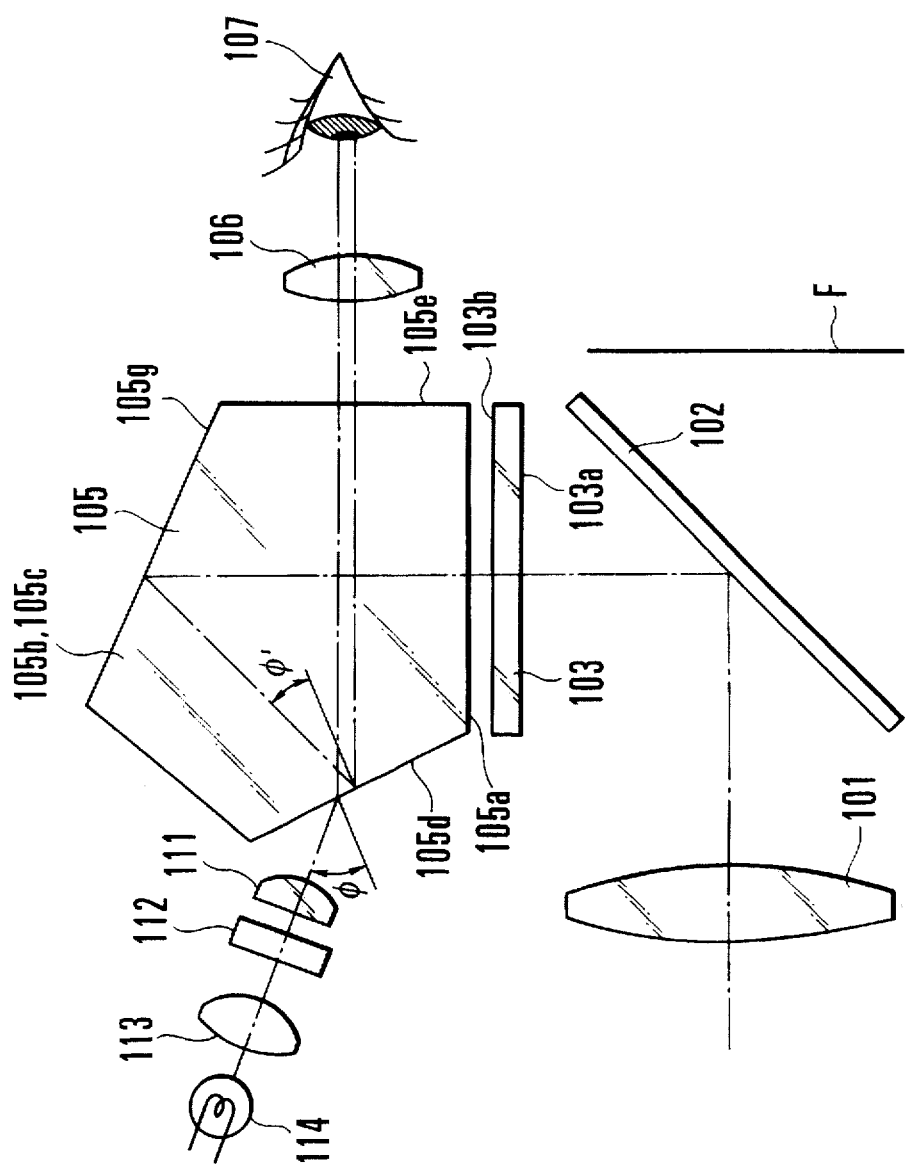
FIG. 12 is a schematic representation showing essential parts of a third embodiment of this invention.

FIG. 12 is a sectional view showing essential parts of a third embodiment of this invention. The third embodiment differs from the first embodiment in respect of the arrangement of the display device, a surface through which the display light from the display device is introduced into the pentagonal prism, etc.

Referring to FIG. 12, a photo-taking lens 101 is arranged to form an object image on a photosensitive surface F which is a photographic film or the like. A movable mirror 102 is arranged to be retracted from a photo-taking optical path when the photosensitive surface F is exposed to light.

A viewfinder system is composed of a focusing screen 103 which has a Fresnel lens 103a on its light entrance side and a matt surface 103b on its light exit side, a pentagonal prism 105, and an eyepiece 106. A half-transmissive dielectric film is coated on a front reflecting surface 105d of the pentagonal prism 105.

When the movable mirror 102 is in its lowered position, as shown in FIG. 12, a light beam from the photo-taking lens 101 is reflected by the movable mirror 102 to form an object image on the matt surface 103b of the focusing screen 103. The light beam having exited from the focusing screen 103 enters the pentagonal prism 105 at its entrance surface 105a. In the pentagonal prism 105, the light beam is reflected once by each of roof surfaces 105b and 105c located respectively in front and in rear of the drawing as viewed in FIG. 2 across a ridge line 105g. After that, the light beam reaches the surface 105d and is reflected once again there to exit from an exit surface 105e. The light beam having exited from the pentagonal prism 105 is made incident on the eye 107 of a viewer through an eyepiece 106.

Elements essential to a superimposed display in the third embodiment are next described. An electric lamp 114 which is employed as a light source, a collective lens 113, a TN type liquid crystal display 112, i.e., a display part, and a projection lens 111 are disposed in front of the pentagonal prism 105. When the display part 112 is illuminated with a light beam by the light source 114, a light beam is emitted from the display part 112. The emitted light beam is collected by the projection lens 111 and then enters the pentagonal prism 105 at the surface 105d. After passing through the pentagonal prism 105, the light beam reaches the eye 107 of the viewer through the eyepiece 106. As a result, a viewfinder image on the focusing screen 103 and display information by the display part 112 are viewed in a superimposed state.

Figure 13:
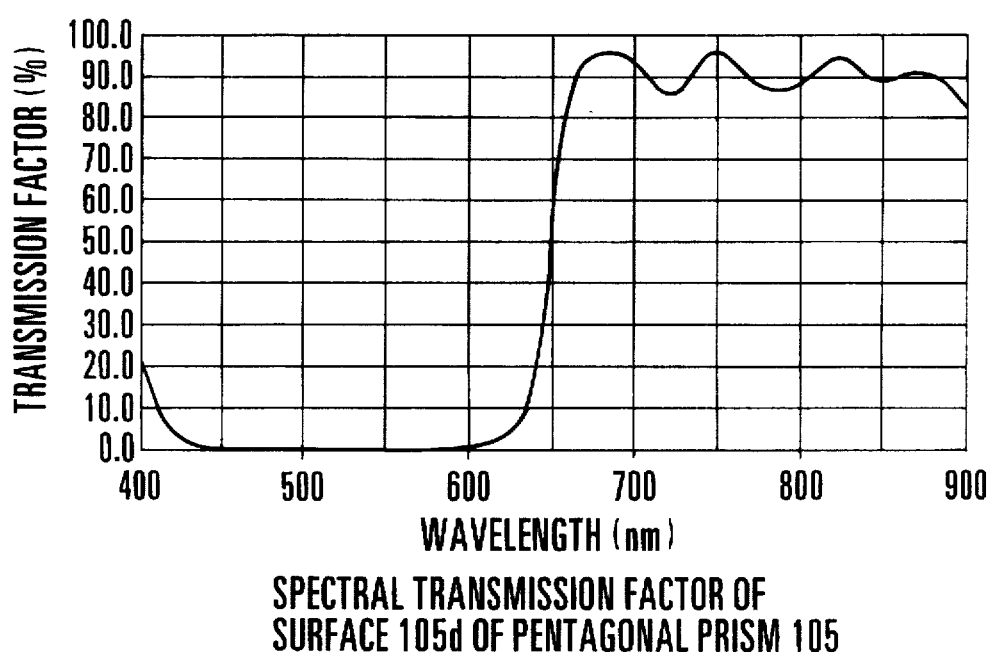
FIG. 13 shows the spectral transmission factor of a light splitting surface shown in FIG. 12.

The spectral characteristics of the surface 105d of the pentagonal prism 105 in the third embodiment are next described. FIG. 13 shows the spectral transmission factor characteristic of the surface 105d of the pentagonal prism 105. Referring to FIG. 13, the angle of incidence of a ray of light on the surface 105d is set at angles $\phi$ and $\phi'$ shown in FIG. 12. In the case of this display system, the display light is not polarized. Therefore, the transmission factor characteristic is indicated by an average value of S-polarized light and P-polarized light. The transmission factor is about 50% at a wavelength of 650 nm and a very high transmission factor of about 90% at wavelengths longer than 650 nm. The transmission factor at wavelengths shorter than 650 nm is, on the other hand, almost 0%. In other words, to the surface 105d is applied a dielectric film which has a higher transmission factor at long wavelengths of the visible range than at the middle part of the visible range. Generally, dielectric multilayer films do not absorb light and have a spectral reflection factor characteristic obtained by inverting the scales 0 and 100 of the ordinate axis. Therefore, among the components of the object light having passed through the focusing screen 11, the light components of wavelengths below 650 nm or thereabout reach the eyepiece 106 disposed in the rear part of the viewfinder. All the light components that are of wavelengths longer than 650 nm or thereabout are cut off.

As mentioned in the foregoing description of the first embodiment, when the object image is viewed by cutting this region of wavelengths, the viewfinder image appears untinged and its color is almost the same as the actual color of the object. Besides, since a major portion of the light quantity is transmitted, the luminance of the viewfinder image is never lowered by the pentagonal prism 105.

The electric lamp 114 which is employed as the of the display system has, for the whole visible range, a luminous characteristic having a high degree of intensity in the red color region. However, due to the spectral transmission factor characteristic of the surface 105b of the pentagonal prism 105 shown in FIG. 12, only such components of wavelengths that are longer than the wavelength of 650 nm are allowed to enter the inside of the pentagonal prism 105. Therefore, the display pattern projected on the liquid crystal display 112 by the projection lens 111 is visible in a red color.

TABLE 1

Relative Luminous Efficiency

| Wavelength | Light adaptation relative luminous efficiency, V(λ) | Dark adaptation relative luminous efficiency, VT(λ) |
| --- | --- | --- |
| 380 | 0.0000 | 0.000589 |
| 390 | 0.0001 | 0.002209 |
| 400 | 0.0004 | 0.00929 |
| 410 | 0.0012 | 0.03484 |
| 420 | 0.0040 | 0.0966 |
| 430 | 0.0116 | 0.1998 |
| 440 | 0.023 | 0.3281 |
| 450 | 0.038 | 0.455 |
| 460 | 0.060 | 0.567 |
| 470 | 0.091 | 0.676 |
| 480 | 0.139 | 0.793 |
| 490 | 0.208 | 0.904 |
| 500 | 0.323 | 0.982 |
| 510 | 0.503 | 0.997 |
| 520 | 0.710 | 0.935 |
| 530 | 0.862 | 0.811 |
| 540 | 0.954 | 0.650 |
| 550 | 0.995 | 0.481 |
| 560 | 0.995 | 0.3288 |
| 570 | 0.952 | 0.2076 |
| 580 | 0.870 | 0.1212 |
| 590 | 0.757 | 0.0655 |
| 600 | 0.631 | 0.03315 |
| 610 | 0.503 | 0.01593 |
| 620 | 0.381 | 0.00737 |
| 630 | 0.265 | 0.003335 |
| 640 | 0.175 | 0.001497 |
| 650 | 0.107 | 0.000677 |
| 660 | 0.061 | 0.0003129 |
| 670 | 0.032 | 0.0001480 |

TABLE 1-continued

Relative Luminous Efficiency

| Wavelength | Light adaptation relative luminous efficiency, V(λ) | Dark adaptation relative luminous efficiency, VT(λ) |
| --- | --- | --- |
| 680 | 0.017 | 0.0000715 |
| 690 | 0.0082 | 0.00003533 |
| 700 | 0.0041 | 0.00001780 |
| 710 | 0.0021 | 0.00000914 |
| 720 | 0.00105 | 0.00000478 |
| 730 | 0.00052 | 0.000002546 |
| 740 | 0.00025 | 0.000001379 |
| 750 | 0.00012 | 0.000000760 |
| 760 | 0.00006 | 0.000000425 |
| 770 | 0.00003 | 0.000000241 |
| 780 | 0.000015 | 0.000000139 |

Note: This table is taken from Publication CIA No. 17 (1970)

I claim:

1. An intra-viewfinder display device comprising:
   an optical system having a light splitting surface and arranged to guide light coming from an object to a viewer; and
   display means for displaying information by using light of a predetermined wavelength, the information displayed by said display means being transmitted to the viewer by utilizing said light splitting surface,
   wherein said light splitting surface has respective different spectral characteristics with respect to light of a wavelength band including the predetermined wavelength and light coming from the object of wavelengths not included in the wavelength band.

2. An intra-viewfinder display device according to claim 1, wherein said light splitting surface has a high reflection characteristic with respect to light of a wavelength band including the predetermined wavelength, and has a high transmission characteristic with respect to light coming from the object of wavelengths not included in the wavelength band.

3. An intra-viewfinder display device according to claim 2, wherein said optical system includes:
   a focusing screen;
   a condenser lens; and
   a pentagonal prism, and
   wherein an object image formed on said focusing screen is guided to said pentagonal prism through said condenser lens, and said light splitting surface is provided in said condenser lens.

4. An intra-viewfinder display device according to claim 1, wherein said light splitting surface has a high transmission characteristic with respect to light of a wavelength band including the predetermined wavelength, and has a high reflection characteristic with respect to light coming from the object of wavelengths not included in the wavelength band.

5. An intra-viewfinder display device according to claim 4, wherein said optical system includes:
   a focusing screen; and
   a pentagonal prism, and
   wherein an object image formed on said focusing screen is guided to said pentagonal prism, and said light splitting surface is provided on a reflecting surface of said pentagonal prism.

6. An intra-viewfinder display device according to claim 1, wherein the light of the predetermined wavelength includes light of a long wavelength band in a visible range.

7. An intra-viewfinder display device according to claim 6, wherein the light of the predetermined wavelength is S-polarized light relative to said light splitting surface.

8. An intra-viewfinder display device according to claim 1, wherein said light splitting surface has a refractive power.

9. An intra-viewfinder display device according to claim 8, wherein said light splitting surface is decentered with respect to said optical system, and said display means provides a display including distortion so as to correct a distortion caused by the decentered state of said light splitting surface.

10. An intra-viewfinder display device comprising:
   an optical system having a light splitting surface having a refractive power, and arranged to guide light coming from an object to a viewer; and
   display means for displaying information, the information displayed by said display means being transmitted to the viewer by utilizing said light splitting surface.

11. An intra-viewfinder display device according to claim 10, wherein said light splitting surface has respective different spectral characteristics with respect to light of a wavelength band including a predetermined wavelength and light coming from the object of wavelengths not included in the wavelength band.

12. An intra-viewfinder display device according to claim 11, wherein said light splitting surface has a high reflection characteristic with respect to light of a wavelength band including the predetermined wavelength, and has a high transmission characteristic with respect to light coming from the object of wavelengths not included in the wavelength band.

13. An intra-viewfinder display device according to claim 12, wherein said optical system includes:
   a focusing screen;
   a condenser lens; and
   a pentagonal prism, and
   wherein an object image formed on said focusing screen is guided to said pentagonal prism through said condenser lens, and said light splitting surface is provided in said condenser lens.

14. An intra-viewfinder display device according to claim 11, wherein the light of the predetermined wavelength includes light of a long wavelength band in a visible range.

15. An intra-viewfinder display device according to claim 14, wherein the light of the predetermined wavelength is S-polarized light relative to said light splitting surface.

16. An intra-viewfinder display device according to claim 10, wherein said light splitting surface is decentered with respect to said optical system, and said display means provides a display including distortion so as to correct a distortion caused by the decentered state of said light splitting surface.

17. An optical apparatus comprising:
   a photo-taking optical system; and
   an intra-viewfinder display device including:
      a viewfinder optical system having a light splitting surface and arranged to guide light coming from an object to a viewer; and
      display means for displaying information by using light of a predetermined wavelength, the information displayed by said display means being transmitted to the viewer by utilizing said light splitting surface,
   wherein said light splitting surface has respective different spectral characteristics with respect to light of a wavelength band including the predetermined wavelength and light coming from the object of wavelengths not included in the wavelength band.

18. An optical apparatus according to claim 17, wherein said light splitting surface has a high reflection characteristic with respect to light of a wavelength band including the predetermined wavelength, and has a high transmission characteristic with respect to light coming from the object of wavelengths not included in the wavelength band.

19. An optical apparatus according to claim 18, wherein said viewfinder optical system includes:
   a focusing screen;
   a condenser lens; and
   a pentagonal prism, and
   wherein an object image formed on said focusing screen is guided to said pentagonal prism through said condenser lens, and said light splitting surface is provided in said condenser lens.

20. An optical apparatus according to claim 17, wherein said light splitting surface has a high transmission characteristic with respect to light of a wavelength band including the predetermined wavelength, and has a high reflection characteristic with respect to light coming from the object of wavelengths not included in the wavelength band.

21. An optical apparatus according to claim 20, wherein said viewfinder optical system includes:
   a focusing screen; and
   a pentagonal prism, and
   wherein an object image formed on said focusing screen is guided to said pentagonal prism, and said light splitting surface is provided on a reflecting surface of said pentagonal prism.

22. An optical apparatus according to claim 17, the light of the predetermined wavelength includes light of a long wavelength band in a visible range.

23. An optical apparatus according to claim 22, wherein the light of the predetermined wavelength is S-polarized light.

24. An optical apparatus according to claim 17, wherein said light splitting surface has a refractive power.

25. An optical apparatus according to claim 24, wherein said light splitting surface is decentered with respect to said viewfinder optical system, and said display means provides a display including distortion so as to correct a distortion caused by the decentered state of said light splitting surface.

26. An optical apparatus comprising:
   a photo-taking optical system; and
   an intra-viewfinder display device including:
      a viewfinder optical system having a light splitting surface having a refractive power, and arranged to guide light coming from an object to a viewer; and
      display means for displaying information, the information displayed by said display means being transmitted to the viewer by utilizing said light splitting surface.

27. An optical apparatus according to claim 26, wherein said light splitting surface has a high reflection characteristic with respect to light of a wavelength band including the predetermined wavelength, and has a high transmission characteristic with respect to light coming from the object of wavelengths not included in the wavelength band.

28. An optical apparatus according to claim 27, wherein said light splitting surface has a high reflection characteristic for light of a wavelength region which includes the predetermined wavelength and a high transmission characteristic for light coming from the object of wavelengths not included in the wavelength region.

29. An optical apparatus according to claim 28, wherein said viewfinder optical system includes:

a focusing screen;

a condenser lens; and a pentagonal prism, and wherein an object image formed on said focusing screen is guided to said pentagonal prism through said condenser lens, and said light splitting surface is provided in said condenser lens.

30. An optical apparatus according to claim 27, wherein the light of the predetermined wavelength includes light of a long wavelength band in a visible range.

31. An optical apparatus according to claim 30, wherein the light of the predetermined wavelength is S-polarized light relative to said light splitting surface.

32. An optical apparatus according to claim 26, wherein said light splitting surface is decentered with respect to said viewfinder optical system, and said display means provides a display including distortion so as to correct a distortion caused by the decentered state of said light splitting surface.

* * * * *

UNITED STATES PATENT AND TRADEMARK OFFICE
CERTIFICATE OF CORRECTION

PATENT NO. : 5,754,900
DATED : May 19, 1998
INVENTOR(S) : Yasuo Suda

It is certified that error appears in the above-identified patent and that said Letters Patent is hereby corrected as shown below:

Title page, Item [75], delete "Yokohama" and insert -- Kanagawa-ken --.

Col. 3, line 24, after "the" (first occurrence) insert -- light source --.

Signed and Sealed this

Twenty-second Day of December, 1998

Attest:

BRUCE LEHMAN

Attesting Officer

Commissioner of Patents and Trademarks